Patented Jan. 15, 1946

2,393,166

UNITED STATES PATENT OFFICE 2,393,166

TREATMENT OF DRILLING FLUIDS

Raymond W. Hoeppel, Arcadia, Calif., assignor to National Lead Company, Los Angeles, Calif., a corporation of New Jersey No Drawing. Application April 7, 1943,
Serial No. 482,210

18 Claims. (Cl. 252—8.5)

This invention relates to the art of chemically treating drilling fluids, such as are used in the rotary method of drilling oil and gas wells, where the drilling fluid is subject to substantial contamination by hydroxyl ions or is so contaminated, and relates particularly to the treatment of such muds which have been contaminated with cement.

In the drilling of wells by the rotary method, a drilling fluid is used which generally consists of an aqueous clay suspension, often containing weighting agents such as barytes or hematite, to increase the hydrostatic head, and frequently containing also concentrated colloidal suspending and conditioning agents such as bentonite.

The drilling fluid serves to bring cuttings to the surface, to cool the bit, and to keep oil, gas and water confined to their respective formations during the drilling process. For these functions it is necessary that the drilling fluid be of pumpable viscosity, have sufficient gel-strength to bring cuttings to the surface, and yet be fluid enough to release cuttings and entrained gas at the surface.

A highly important property of drilling muds is the ability to form an impervious filter cake upon the permeable walls of the bore hole, thus inhibiting further ingress of water from the drilling fluid into the formation. A drilling mud deficient in this property allows an undue amount of water to enter the formation, which leads to caving and loss of production in productive formations, and also permits the formation of a thick filter cake which may stick the drill stem, and in any case greatly increases the swabbing action when the bit is withdrawn from the hole.

In the drilling of a well, formations are encountered, the cuttings of which will enter the fluid and may contaminate the same with hydroxyl ions. These disadvantageously affect the viscosity, gel strength and water loss of the fluid. For example, less than 1% of calcium hydroxide, may serve to cause an otherwise freely flowing drilling fluid to change into a plastic mass even thicker than commercial mayonnaise, so that the fluid is thereafter not pumpable, fails to deposit cuttings in the ditch, becomes gas-cut, i. e., retains gas picked up in the hole so that its effect of density becomes lighter and lighter, making pumping even more difficult, and completely loses its useful walling properties.

In well drilling it is frequently necessary to seal off formations by cementing; thereafter, the drilling is frequently proceeded with after such cementing. As is well known, hydraulic cement even after it has set contains a great deal of free lime, and thus is capable of adding calcium ions to water in contact therewith, not only because of this free lime content, but probably also because of its content of semi-soluble calcium alumino silicates and other calcium compounds.

One of the objects of this invention, therefore, is to provide means of treating such contaminated drilling fluids to counteract or inhibit their contamination by hydroxyl ions.

Another object is to provide a process for such treatment.

Another object is to provide a drilling fluid and composition which will counteract or inhibit contamination of the fluid by hydroxyl ions.

Further objects will appear from the detailed description in which will be set forth a number of embodiments of this invention; it will, however, be understood that this invention is susceptible of various embodiments within the scope of the appended claims.

Generally stated, and in accordance with this invention, where the drilling fluid is subject to substantial contamination by hydroxyl ions or is so contaminated, there is employed a salt of an acid whose calcium salt is insoluble, and of a base whose sulfate salt is insoluble and which itself is sufficiently soluble to react with sulfates, together with sulfuric acid or a soluble sulfate of a metal whose hydroxide is insoluble. A particular class of the first named salts are those of a group consisting of most barium and strontium salts of carbonic, orthophosphoric, oxalic and tartaric acids; the second named reagents are of a group consisting of sulphuric acid and its sodium, potassium or ammonium salts or the sulfates of those basic elements whose hydroxides are insoluble in the fluid. The reagents are sufficiently soluble to react with each other and cause one of their reaction products to react with and cause conversion of the hydroxyl to water or to a precipitate, but without leaving any undesirable ions in the drilling fluid. Sufficient of the second named reagent is employed to produce a substantial reaction product for conversion of the hydroxyl.

A particular effective means and method is by the employment of barium carbonate and ferric sulfate. The reactions reference calcium hydroxide are as follows:

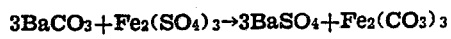

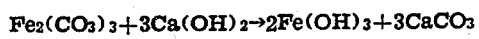

From the above it will be seen that the final products are precipitates and insoluble in the drilling fluid and all are inert. Barium sulfate and barium carbonate are both mud weighting materials and improve the fluid characteristics.

Instead of barium carbonate, other barium salts may be employed such as barium oxalate and barium tartrate. Strontium salts, such as strontium oxalate and strontium tartrate may also be employed instead of barium carbonate. All of these are generally insoluble but are sufficiently soluble in drilling fluids to react with ferric sulfate.

Instead of ferric sulfate there may also be employed the copper, magnesium, nickel, acid sodium or ammonium salts of sulfuric acid, such as copper sulfate, nickel sulfate, acid sodium sulfate ($NaHSO_4$), and the ammonium sulfates ($NH_4HSO_4$ or $(NH_4)_2SO_4$). Ferrous sulfate ($FeSO_4, 7H_2O$) may also be employed. Sulfuric acid may also be used, in which case the reactions are as follows:

$$BaCO_3 + H_2SO_4 \rightarrow BaSO_4 + H_2CO_3$$
$$H_2CO_3 + Ca(OH)_2 \rightarrow 2HOH + CaCO_3$$

It will again be seen that the precipitates, barium sulfate and calcium carbonate are insoluble in water, while the remaining reaction product is water.

Generally stated, the iron cation is superior to the sodium cation, inasmuch as the iron cation is entirely precipitated from the solution and lowers the pH. The ammonium cation is also superior to the sodium cation, as it is a weaker base, and as eventually it is removed by volatilization with a subsequent lowering of pH when that is desired. It will be noted with reference to sulfuric acid that while it is added to the fluid it is immediately converted by the barium carbonate, particularly where, as is preferable, the barium carbonate is added to the fluid before the addition of the sulfuric acid or the other sulfate reagents enumerated above.

The counteracting or inhibiting compounds may be employed in any suitable manner, as by adding them to the drilling fluid to become mixed therewith. Preferably the barium (or strontium) compound is added to the fluid before the addition of the second compound, such as ferric sulfate. The compounds may be employed to counteract the hydroxyl ions already in the fluid; however, it is advantageous to add them to the fluid a substantial period before such contamination is liable to occur. This can be readily determined, for example, with cement by adding the compounds before the drill reaches the formation containing the cement, whose depth is already known. In this way the fluid will be maintained in its previously prepared condition, or even improved, and less of the compound will be required.

The amount of the counteracting or inhibiting compounds required will depend upon the nature and proportion of the hydroxyl ions which have or are liable to enter the fluid, for the action is one of counteracting or inhibiting the effect of the hydroxyl ions. Where the compounds are of a nature which are themselves otherwise inert and otherwise produce resulting compounds which are inert, an excess can do no harm and may, in fact, improve the drilling fluid. That is particularly true of the barium and strontium compounds, which themselves are mud weighting materials and result in compounds which are mud weighting materials.

The compounds may be furnished as a part of prepared mixtures, for instance, of barium carbonate and ferric sulfate. The barium and strontium compounds may, moreover, be admixed in a mixture with bentonite or barium sulfate or both. Barium carbonate and ferric sulfate may, moreover, be admixed with barium sulfate or bentonite or both. Moreover, a mud thinner, such as caustic and quebracho extract, or disodium dihydrogen pyrophosphate may be incorporated in any of the above mixtures.

In order to illustrate the practical applications of this invention, the following tests and results will be given:

I

A drilling mud which, when added to water, contained 38% solids at 18 centipoises and also 0.8% of bentonite was contaminated with 2 pounds per barrel of cement and treated with the following results:

| No. | Thinner Lb./bbl | Added type | Initial | | | | After 18 hours at 155° F. | | | | |
|---|---|---|---|---|---|---|---|---|---|---|---|
| | | | Aging time Minutes | Visc. Centipoises | pH | 30' water loss Milliliters | Visc. Centipoises | pH | Ini. gel Grams | Fin. gel Grams | 30' water loss Milliliters |
| (1) | 0 | Blank (no cement) | --------- | 18.2 | 8.70 | --------- | 19.0 | 8.70 | 38 | 60 | 19.9 |
| (2) | 0 | Blank (cement) | --------- | (¹) | 11.35 | --------- | (¹) | 11.32 | --------- | --------- | 35.8 |
| (3) | 0.70 | $NaHCO_3$ | 120 | 24.2 | 11.32 | 22.5 | 35.2 | 11.18 | --------- | --------- | 25.0 |
| (4) | 1.40 | $NaHCO_3$ | 120 | 10.0 | 10.40 | 17.9 | 11.2 | 11.00 | 7 | 68 | 19.6 |
| (5) | { 7.0 / 1.7 } | $BaCO_3$ / $Fe_2(SO_4)_3$ | 20 | 16.0 | 9.28 | --------- | 12.2 | 9.62 | 10 | 56 | 20.2 |
| (6) | { 7.0 / 2.1 } | $BaCO_3$ / $Fe_2(SO_4)_3$ | 20 | 17.8 | 8.89 | --------- | 15.0 | 9.13 | 17 | 56 | 20.4 |

¹ Plastic.

In these tests the viscosity is in centipoises (cps.) Stormer, the pH is in accordance with the Beckman pH meter, the gel strength is in grams (g.) with the initial gel strength immediately after agitation and the final gel strength after 10 minutes, and the water loss is in milliliters (ml.) taken after 30 minutes (30'); all of these are in accordance with standard practice.[1]

Test (2) shows that the fluid has become plastic (P1), that the pH has taken a sharp rise, and that the water loss has almost doubled. Tests (3) and (4) show treatments with a commercial treating agent, namely, sodium bicarbonate. Tests (9) and (10) show treatments in accordance with this invention. The following will be observed: the viscosities in tests (3)–(6) have been restored in all cases. In tests (5) and (6) the pH has been reduced a greater extent than even in (4). However, the greatest improvement in (5) and (6) takes place after heating the fluid, while the viscosities in (4), (5) and (6) are comparable again. The pH in (5) and (6) has

[1] See Drilling Mud, May, 1940, pp. 4 etc. describing the above procedure, or see American Petroleum Institute Code No. 29.

not risen materially and has remained below that of (3) and (4). The water losses are, moreover, about the same for (4), (5) and (6). However, an improvement of (5) and (6) is shown in the gel strength, which is substantially lower than that of 4 and is definitely improved.

A test was made on a Mojave mud (known as P-34), which when made up into a fluid of 18 centipoises contained 40% solids. This after being "cement cut" with 2 pounds per barrel of cement and treated with sodium bicarbonate and the compounds in accordance with this invention, showed the following results:

| No. | Thinner | Added type | Aging time | Visc. | pH | 30' water loss | Visc. | Ini. gel | Fin. gel | pH | 30' water loss |
|---|---|---|---|---|---|---|---|---|---|---|---|
| | Lb./bbl. | | Minutes | Centipoises | | Milliliters | Centipoises | Grams | Grams | | Milliliters |
| (1) | 0 | Blank (no cement) | | 20.8 | 9.30 | 8.8 | 24.0 | 10 | 71 | | 8.6 |
| (2) | 0 | Blank (with cement) | | 46 | 12.05 | | (1) | | | 12.10 | 14.2 |
| (3) | 1.12 | NaHCO$_3$ | 5 | 21.8 | 10.75 | | | | | | |
| (4) | 1.40 | ...do... | 5 | 21.8 | 10.62 | 10.8 | 21.0 | 10 | 110 | 11.75 | 10.4 |
| (5) | 7.00 / 1.68 | BaCO$_3$ / Fe$_2$(SO$_4$)$_3$ | 10 | 33.0 | 9.60 | | | | | | |
| (6) | 7.00 / 1.68 | BaCO$_3$ / Fe$_2$(SO$_4$)$_3$ | 20 | 23.8 | 9.72 | 10.4 | 16.7 | 5 | 55 | 10.69 | 11.0 |

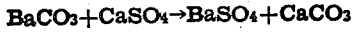

Here again the treatment, in accordance with this invention, shows not only a greater reduction in pH, but also in gel strength within a better operable range, while the water losses are about the same and the viscosities are within a good range.

Not only does this invention effect the counteracting and inhibiting action of contamination by calcium and hydroxyl ions, such as in cement, but one of the two compounds is also effective in itself in counteracting or inhibiting sulfate ions. For example, where barium carbonate is used as one of the pair of treating agents, then in the event that gypsum is encountered, the action is as follows:

$$BaCO_3 + CaSO_4 \rightarrow BaSO_4 + CaCO_3$$

It will be seen that again the sulfate is precipitated as barium sulfate, and that the latter, as well as calcium carbonate, are weighting materials. In this case it is only necessary to employ sufficient barium carbonate to satisfy the calcium sulfate, as well as the ferric sulfate, in order to convert both the sulfates into barium sulfate. However, an excess of barium carbonate will do no harm but indeed improve the fluid, because of its mud weighting properties. In accordance with this invention, therefore, the compounds may be employed to counteract and inhibit the effect not only of cement cut muds, but also of gypsum, and even of sodium sulfate, which similarly is converted to barium sulfate and sodium carbonate.

It will, therefore, be seen that the invention accomplishes its objects. A simple means is provided for the elimination of any effect of cement or other hydroxyl ions, and even of the effect of gypsum and other sulfates. All of this is accomplished by materials which are available at low prices; for barium carbonate may be used in its natural state as Witherite, and strontium sulfate, in its natural state, as Strontianite. Ferric sulfate is, moreover, comparatively cheap.

As compared to the employment of sodium bicarbonate, this invention has the following advantages:

The pH of the mud is reduced to a lower value; the viscosity of the mud is reduced to a lower value; considerably lower final gel strengths result, thus reducing damage from the swabbing effect. The barium carbonate used also removes gypsum contamination; and the barium carbonate used and the barium sulfate formed are both good weighting materials. The mud remains conditioned even after long periods of heating; in fact, heating actually improves the mud. The treatment is no more expensive than the bicarbonate procedure and is more permanent. The materials are easily shipped and handled, and can be added in solid form.

Having thus described the invention, what is claimed is:

1. In the art of drilling wells by the employment of a mud-laden fluid subject to substantial contamination by hydroxyl ions during the course of drilling, the process comprising, adding to the fluid a salt of an acid whose calcium salt is insoluble and of a base whose sulfate salt is insoluble and which itself is sufficiently soluble to react with sulfates, together with a sulfate of a metal whose hydroxide is insoluble.

2. In the art of drilling wells by the employment of a mud-laden fluid subject to substantial contamination by hydroxyl ions during the course of drilling, the process comprising, adding to the fluid a salt of an acid whose calcium salt is insoluble and of a base whose sulfate salt is insoluble and which itself is sufficiently soluble to react with sulfates, together with a reagent of a group consisting of sulphuric acid and its sodium, potassium and ammonium salts and the sulfates of those basic elements whose hydroxides are insoluble.

3. In the art of drilling wells by the employment of a mud-laden fluid subject to substantial contamination by hydroxyl ions during the course of drilling, the process comprising, adding to the fluid a salt of a group consisting of the barium and strontium salts of carbonic, oxalic, orthophosphoric, and tartaric acids and which salt is sufficiently soluble to react with sulfates, together with a reagent of a group consisting of sulphuric acid and its sodium, potassium and ammonium salts and the sulfates of those basic elements whose hydroxides are insoluble.

4. In the art of drilling wells by the employment of a mud-laden fluid subject to substantial contamination by hydroxyl ions during the course of drilling, the process comprising, adding to the fluid barium carbonate and ferric sulfate.

5. In the art of drilling wells by the employment of a mud-laden fluid subject to substantial contamination by cement, the process comprising, adding to the fluid a salt of a group consisting of the barium and strontium salts of carbonic, oxalic, orthophosphoric and tartaric acids and which salt is sufficiently soluble to react with sulfates, together with a reagent of a group consisting of sulfuric acid and its sodium, potassium and ammonium salts and the sulfates of those basic elements whose hydroxides are insoluble.

6. In the art of drilling wells by the employment of a mud-laden fluid subject to substantial contamination by cement, the process comprising, adding to the fluid barium carbonate and ferric sulfate.

7. In the art of drilling wells by the employment of a mud-laden fluid subject to substantial contamination by hydroxyl ions during the course of drilling, the process comprising, adding to the fluid a salt of a group consisting of the precipitated barium and strontium salts of carbonic, oxalic, orthophosphoric and tartaric acids and which salt is sufficiently soluble to react with sulfates, together with a reagent of a group consisting of sulfuric acid and its sodium, potassium and ammonium salts and the sulfates of those basic elements whose hydroxides are insoluble.

8. In the art of drilling wells by the employment of a mud-laden fluid subject to substantial contamination by hydroxyl ions during the course of drilling, the process comprising, adding to the fluid a substantial period before such contamination, a salt of an acid whose calcium salt is insoluble and of a base whose sulfate salt is insoluble and which itself is sufficiently soluble to react with sulfates, together with a sulfate of a metal whose hydroxide is insoluble.

9. In the art of drilling wells by the employment of a mud-laden fluid subject to substantial contamination by cement, the process comprising, adding to the fluid a substantial period before such contamination, a salt of a group consisting of the barium and strontium salts of carbonic, oxalic, orthophosphoric and tartaric acids and which salt is sufficiently soluble to react with sulfates, together with a reagent of a group consisting of sulfuric acid and its sodium, potassium and ammonium salts and the sulfates of those basic elements whose hydroxides are insoluble.

10. In the art of drilling wells by the employment of a mud-laden fluid subject to substantial contamination by hydroxyl and sulfate ions during the course of drilling, the process comprising, adding to the fluid a salt of an acid whose calcium salt is insoluble and of a base whose sulfate salt is insoluble and which itself is sufficiently soluble to react with sulfates, together with a sulfate of a metal whose hydroxide is insoluble.

11. In the art of drilling wells by the employment of a mud-laden fluid subject to substantial contamination by hydroxyl and sulfate ions during the course of drilling, the process comprising, adding to the fluid a salt of a group consisting of the barium and strontium salts of carbonic, oxalic, orthophosphoric and tartaric acids and which salt is sufficiently soluble to react with sulfates, together with a reagent of a group consisting of sulphuric acid and its sodium, potassium and ammonium salts and the sulfates of those basic elements whose hydroxides are insoluble.

12. In the art of drilling wells by the employment of a mud-laden fluid subject to substantial contamination by hydroxyl and sulfate ions during the course of drilling, the process comprising, adding to the fluid barium carbonate and ferric sulfate.

13. A prepared composition for the treatment of aqueous drilling fluids to remove hydroxyl ions therefrom, comprising, a salt of an acid whose calcium salt is insoluble and of a base whose sulfate salt is insoluble and which itself is sufficiently soluble to react with sulfates, together with sufficient of a sulfate of a metal whose hydroxide is insoluble, to produce a substantial reaction product for conversion of the hydroxyl.

14. A prepared composition for the treatment of aqueous drilling fluids to remove hydroxyl ions therefrom, comprising, a salt of a group consisting of the barium and strontium salts of carbonic, oxalic, orthophosphoric and tartaric acids and which salt is sufficiently soluble to react with sulfates, together with sufficient of a reagent of a group consisting of sulphuric acid and its sodium, potassium and ammonium salts and the sulfates of those basic elements whose hydroxides are insoluble, to produce a substantial reaction product for conversion of the hydroxyl.

15. A prepared composition for the treatment of aqueous drilling fluids to remove hydroxyl ions therefrom, comprising, barium carbonate and sufficient ferric sulfate to produce a substantial reaction product for conversion of the hydroxyl.

16. An aqueous mud-laden well drilling fluid containing a salt of an acid whose calcium salt is insoluble and of a base whose sulfate salt is insoluble and which itself is sufficiently soluble to react with sulfates, together with sufficient of a sulfate of a metal whose hydroxide is insoluble, to produce a substantial reaction product for conversion of the hydroxyl.

17. An aqueous mud-laden well drilling fluid containing a salt of a group consisting of the barium and strontium salts of carbonic, oxalic, orthophosphoric, and tartaric acids and which salt is sufficiently soluble to react with sulfates, together with sufficient of a reagent of a group consisting of sulfuric acid and its sodium, potassium and ammonium salts and the sulfates of those basic elements whose hydroxides are insoluble, to produce a substantial reaction product for conversion of the hydroxyl.

18. An aqueous mud-laden well drilling fluid containing barium carbonate and sufficient ferric sulfate to produce a substantial reaction product for conversion of the hydroxyl.

RAYMOND W. HOEPPEL.